(12) United States Patent
Yue

(10) Patent No.: US 6,628,967 B1
(45) Date of Patent: Sep. 30, 2003

(54) WIRELESS COMMUNICATION DEVICE CAPABLE TO TRANSMIT/RECEIVE TTY/TDD MESSAGES WITH VARIABLE DATA RATE, EMBEDDED INTO AUDIO DATA FRAMES

(75) Inventor: Peter P. Yue, St-Laurent (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/475,043

(22) Filed: Dec. 30, 1999

(51) Int. Cl.[7] .............................. H04B 1/38; H04M 1/00
(52) U.S. Cl. ..................... 455/557; 455/552; 379/52; 370/465; 370/466; 370/468
(58) Field of Search ................................ 455/552, 553, 455/557, 556; 379/52; 370/342, 465, 466, 467, 468; 375/246, 251, 253, 259

(56) References Cited

U.S. PATENT DOCUMENTS 6,205,339 B1 * 3/2001 Leung et al. ............... 455/553
6,345,251 B1 * 2/2002 Jansson et al. ............. 704/270
6,351,495 B1 * 2/2002 Tarraf ......................... 379/259

* cited by examiner

Primary Examiner—Edward F. Urban
Assistant Examiner—Temica M. Davis

(57) ABSTRACT

A wireless communication device capable to transmit and receive TTY/TDD characters. The wireless communication device includes a receiver and a transmitter to allow for a full duplex communication. The receiver is responsive to the reception of a data frame including a TTY/TDD silence message to switch to lower data rate operative state where the receiver expects to receive and process data frames at a lower data rate. At the same time the receiver causes the transmitter to switch to a lower data rate operative state and also to return to the remote site with which the wireless communication device communicates a TTY/TDD silence message. The purpose of this TTY/TDD silence message is to set the receiver at the remote site at the lower data rate operative state.

22 Claims, 3 Drawing Sheets

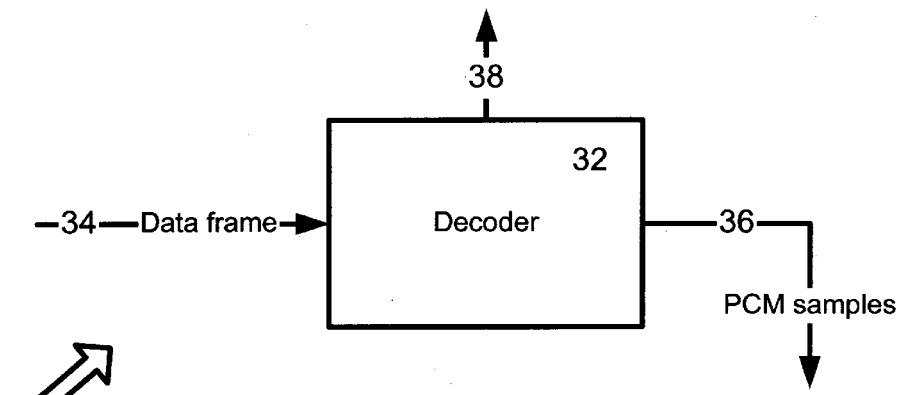
Figure 2
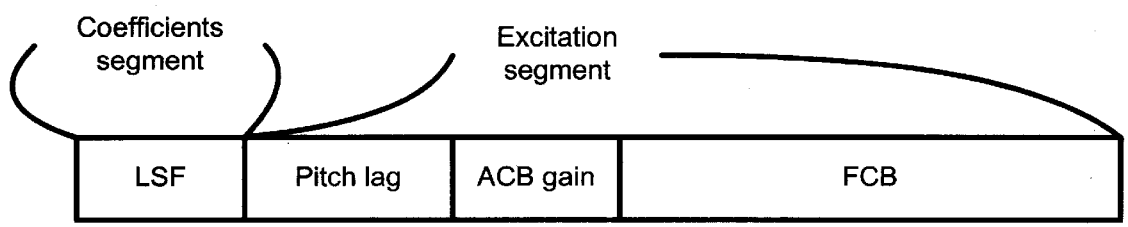
Figure 3a ←------130 bits------→
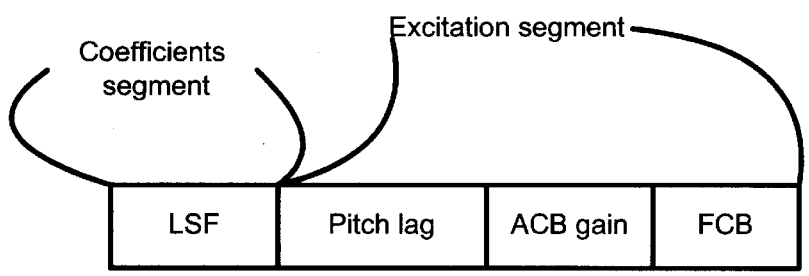
Figure 3b ←--→ 42 bits

WIRELESS COMMUNICATION DEVICE CAPABLE TO TRANSMIT/RECEIVE TTY/TDD MESSAGES WITH VARIABLE DATA RATE, EMBEDDED INTO AUDIO DATA FRAMES

FIELD OF THE INVENTION

The present invention generally relates to the field of wireless communications equipment and processes for the deaf or speech impaired and, more specifically, to the field of TDD and/or TTY devices used by the deaf or speech impaired to communicate. In particular, the invention provides a wireless communication device that can transmit TTY/TDD messages at variable data rate.

BACKGROUND OF THE INVENTION

There is an immediate need to provide enhanced text capabilities for the deaf, hearing impaired, and/or speech impaired communities. This is consistent with an overriding social goal of integrating handicapped individuals into traditional society, which is, in part, perhaps, best illustrated by the two recent statutes passed by the United States Congress and signed by the President of the United States: the Americans with Disabilities Act ("ADA") and the Telecommunications Act of 1996. Among other things, these statutes compel manufactures and telecommunications service providers to enhance existing approaches used by members of the deaf, hearing impaired, and/or speech impaired communities to access and utilize telecommunication networks and systems. For instance, the ADA generally requires that handicapped persons have equal access to public (and, in some cases, private) facilities. Among other things, 47 U.S.C. sctn.225 (b)(1) states that the Federal Communications Commission "shall ensure that interstate and intrastate telecommunications relay services are available, to the extend possible and in the most efficient manner, to hearing-impaired and speech-impaired individuals in the United States." Consequently, over the past several years, it has become imperative for telecommunications companies to develop systems, processes, and apparatus that enable members of the deaf, hearing impaired, and/or speech impaired communities to use telecommunications networks and systems.

Deaf, hearing impaired, and/or speech impaired individuals primarily communicate with others via a Telecommunication Device for the Deaf ("TDD"), which is primarily a teletypewriter ("TTY"). One current problem for users of TTY/TDD devices is that the number of people who can be called is limited, because TTY/TDD users can only have conversations with others who have a TTY/TDD device, have access to a TTY/TDD device, and know how to use a TTY/TDD device.

Compounding this problem is the fact that most TTY/TDD devices currently available in the marketplace are land based and the user must have access to a standard telephone line to be able to communicate. Clearly, it would be desirable to develop wireless TTY/TDD devices that can allow the communication capabilities of the deaf, hearing impaired or speech impaired to be extended in the wireless world.

One problem with designing new systems, processes, and devices, particularly of wireless nature is that TTY/TDD devices are, by today's standards, quite slow. Specifically, TTY/TDD uses the Baudot format consisting of 5-bit characters transmitted at a rate as slow as 45.45 bits per second, which is a TTY/TDD standard. These signals do not have any carrier and only support 38 characters. Numbers and punctuation characters are generally sent after a shift character is sent to change the character mode to a number mode, so as an example, the number "3" and the letter "E" are both represented by the same code (00001).

To make the digital wireless technology accessible to TTY/TDD users it has been recently suggested to modify the existing IS-127 and IS-733 digital communication standard to allow TTY/TTD messages to be transmitted by using audio data frames as a vehicle. Typically, an audio data frame comprises an excitation segment and a coefficients segment. The coefficients segment holds a set of LPC or LSF ("Linear Prediction Coefficients", "Line Spectral Frequencies") coefficients while the excitation segment contains codebook entries, pitch lag information and codebook gain values. When the wireless communication system is used to transport speech sound information the audio data frames sent over the wireless channel are generated at the transmitter from PCM ("Pulse Code Modulation") samples that are processed by an LPC encoder. The reverse operation takes place at the receiver where the audio data frames are converted into PCM samples by an LPC decoder. When a TTY/TDD message is to be sent, the audio data frame is assembled somewhat difficulty. The TTY message that is a succession of characters is represented by the PCM stream as a series of tones. The encoder is designed to recognize the presence of the tones in the PCM stream. When tones are detected, the coefficients segment is computed as usual and a particular code that represents the TTY character is inserted into the pitch lag information field of the audio data frame. In addition, the adaptive codebook gain information field is set to a value that indicates a no gain condition. Actually, the TTY/TDD character is sent over the audio data frames in two different formats. The first format is the code representing the character and placed into the pitch lag information field while the second format is the tones information sent into the coefficients segment. In light of the fact that the tones are generated at a low bit rate, several consecutive audio data frames are required to contain the tone information representing a single character.

The two different formats are used primarily for reasons of backward compatibility. The new style decoders designed to detect the TTY/TDD character tones sent into the pitch lag information field only rely on that information to re-regenerate the tones at the receiver, while older style decoders rely on the FCB ("Fixed Codebook") segment audio information to re-generate the tones. For more information on this topic, the reader is invited to refer to document "Baseline text for the IS-127 EVRC TTY/TDD Extension, TR45.5.1.1/99.04.22.16" The contents of this document is incorporated herein by reference.

One drawbacks of the mode of operation described in "Baseline text for the IS-127 EVRC TTY/TDD Extension, TR45.5.1.1/99.04.22.16" is that the data frames containing TTY/TDD messages are sent at a maximum data rate which represents a waste of bandwidth, in particular when the decoder is capable to reconstruct the TTY/TDD characters based only on the information contained in the pitch lag field of the data frames. In addition, since a single Baudot character spans several data frames, a transmission error in a single frame may cause a loss on an entire character. Stated otherwise, to send a single Baudot character, the wireless channel must be error free for all data frames over which the Baudot character is spread.

The background information provided above clearly indicates that there exists a need in the industry to improve the prior art TTY/TDD wireless transmission system such as to provide a more efficient use of bandwidth.

SUMMARY OF THE INVENTION

In one broad aspect the invention provides a wireless communication device capable to receive and transmit TTY/TDD messages. The wireless communication device has a receiver that includes an input for receiving an RF signal from a remote site containing a succession of data frames transporting speech sound information or a TTY/TDD message. The receiver is capable to acquire a TTY/TDD active mode when the data frames convey a TTY/TDD message and a TTY/TDD inactive mode when the data frames convey speech sound information. When the receiver operates under the TTY/TDD active mode it is capable to acquire either one of a first operative state in which the receiver processes the data frames at a first data rate and a second operative state in which the receiver processes data frames at a second data rate that is lower than the first data rate.

When the receiver operates in the TTY/TDD active mode the receiver processes the data frames to generate an output signal conveying successive characters of the TTY/TDD message. The receiver, when in the TTY/TDD active mode, is responsive to a TTY/TDD silence message contained in at least one data frame that directs the receiver to blank the output signal from any TTY/TDD character, to acquire the second operative mode and thus process data frames at the second lower data rate. A lower bit rate operation represents a more efficient use of the available bandwidth and this represents an advantage over fixed data rate wireless TTY/TDD systems. In addition, the use of a TTY/TDD silence message as a control message to cause an operative state switch has been found advantageous since it does not create any output and thus goes unnoticed by the user.

In a specific non-limiting example of implementation, the wireless communication device is a cellular telephone that receives data frames from a base station in a cellular network. When operating in the TTY/TDD active mode the receiver is by default in the first operative state, where the data frame processing is done at a full (maximum) data rate. When a data frame is received conveying a TTY/TDD silence message, which is communicated by setting bits in the pitch lag field of the data frame to a specific sequence, the receiver infers that the transmitter at the remote site is capable to interpret the TTY/TDD characters by reading the pitch lag field, and switches to the second operative state where the processing is done at a data rate that is half the full data rate (hereinafter "half data rate"). The cellular telephone will then send to the base station a TTY/TDD silence message that will cause the receiver in the base station to switch to the half data rate also.

If for some reason either one of the receivers stops receiving data frames with the TTY/TTD information embedded in the pitch lag field, they both default to the full data rate processing state.

In a possible variant, the wireless communication device is located at the base station of the digital cellular network.

In another broad aspect the invention provides a method for processing data frames sent over a wireless channel in accordance with the principles presented earlier.

Yet, in another broad aspect the invention provides a wireless communication device capable to receive and transmit TTY/TDD messages. The wireless communication device has a receiver and a transmitter for receiving an RF signal from a remote site containing a succession of data frames, and transmitting to the remote site an RF signal containing a succession of data frames transporting speech sound information or a TTY/TDD message. The receiver can acquire either one of a first operative state in which the receiver is operative to process the data frames at a first data rate and a second operative state in which the receiver is operative to process data frames at a second data rate that is lower than the first data rate. The receiver is responsive to a TTY/TDD silence message contained in at least one data frame directing the receiver to blank its output signal from any TTY/TDD character, to acquire the second operative state and also to cause the transmitter to issue toward the remote site a TTY/TDD silence message.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

FIG. 2 is a block diagram of the receiver of the wireless communication device in accordance with the invention;

FIG. 3a is a representation of a data frame according to the IS-127 protocol sent at the full data rate;

FIG. 3b is a representation of a data frame according to the IS-127 protocol sent at the half data rate;

DETAILED DESCRIPTION

Figure 1:
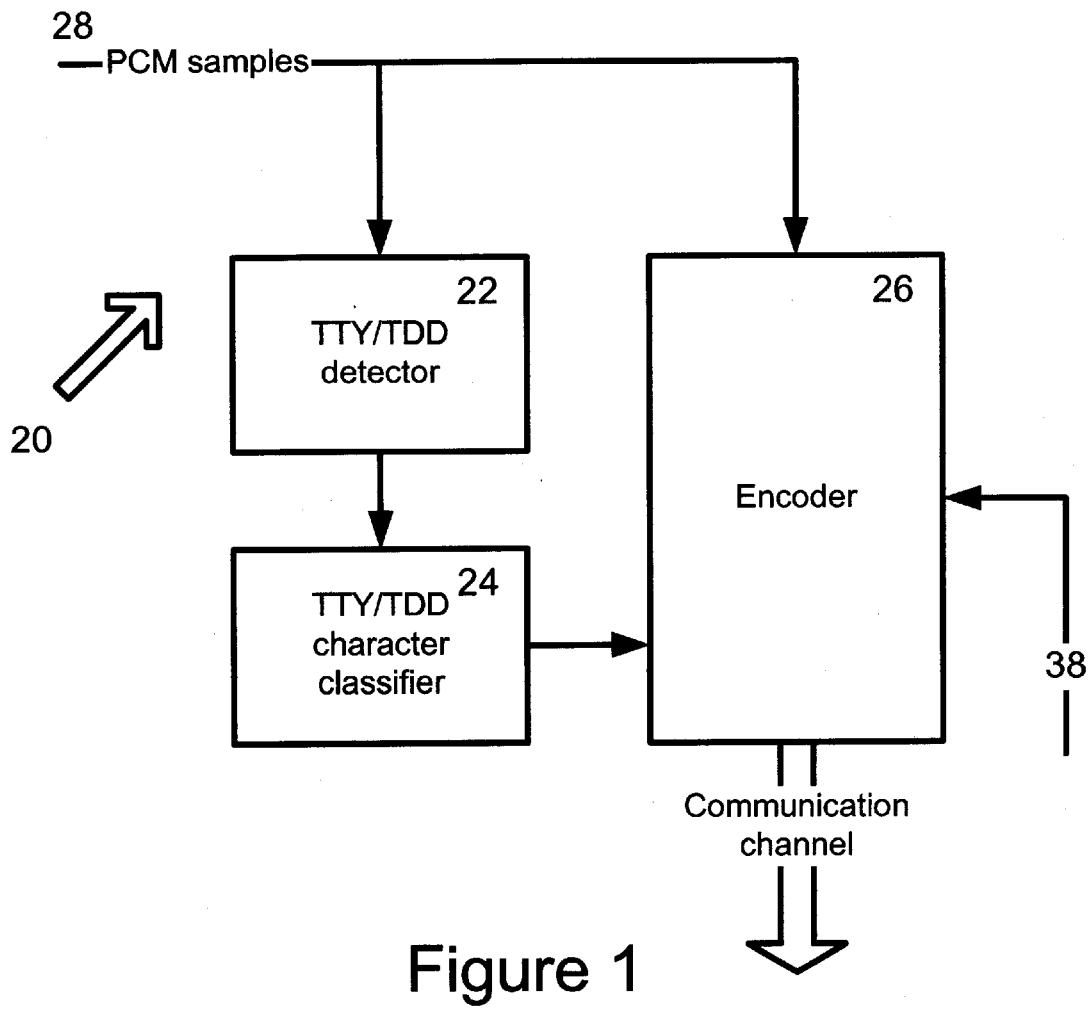
FIG. 1 is a block diagram of the transmitter of the wireless communication device in accordance with the invention.

FIG. 1 is a functional block diagram of the transmitter of a wireless communication device constructed in accordance with the principles of the present invention. The transmitter, designated by the reference numeral 20 comprises three main components, namely a TTY/TDD detector 22, a TTY/TDD character classifier 24 and an encoder 26. In a specific non-limiting example of implementation the encoder complies with the IS-127 or the IS-733 standards. Note that the structure illustrated in FIG. 1 is a functional diagram. The various components are implemented in practice by using any suitable digital signal processing circuit that is programmed to provide the desired functionality.

The transmitter 20 has an input 28 at which is received the signal that is to be transmitted to a remote site. The input signal conveys either one of two possible types of information, namely speech sound information or a succession of TTY/TDD characters forming a TTY/TDD message. The signal received at the input 28 is made up of PCM samples. In the case of the TTY/TDD message, the input signal conveys a series of tones according to the well-known Baudot code that is described in the ITU-Recommendation V.18. The contents of the ITU-Recommendation V.18 are incorporated herein by reference.

The TTY/TDD detector 22 receives the input stream of PCM samples and observes the stream to determine if Baudot tones are present. If Baudot tones are found to exist in the PCM stream, and TTY/TDD detector 22 determines their logical significance. In particular, a 1400 Hz tone signals a logical 1 while a 1800 Hz tone is used to signal a logical 0. The logical values of the Baudot code that are inferred from the PCM samples by the TTY/TDD detector 22 are passed to the TTY/TDD character classifier 24. The function of the TTY/TDD character classifier 24 is to interpret the stream of logical values to determine the TTY/TDD characters that they represent. When a certain character has been identified it is passed to the encoder 26. The TTY/TDD character sent by the TTY/TDD character classifier 24 to the encoder 26 may be in the ASCII format. In other words, the TTY/TDD character classifier 24 converts the logical Baudot values into ASCII characters that are then send to the encoder 26.

The encoder 26 also receives at its input the raw PCM stream of samples. The encoder 26 can acquire two modes of operation namely a TTY/TDD inactive mode, which is the default mode of operation, and the TTY/TDD active mode. In the TTY/TDD inactive mode of operation, the encoder 26 behaves as a standard CELP ("Code Excited Linear Prediction") encoder which receives the audio information (speech sound information on Baudot tones) and encodes the audio information into a series of data frames. Each data frame contains in essence two segments, namely an excitation segment and a coefficients segment. The coefficients segment includes a set of coefficients while the excitation segment includes codebook entries, pitch lag values and gain information. When the data frames are supplied to a receiver at the remote site, based on information contained in the data frames the PCM samples in the input signal can be reconstructed. FIG. 3a illustrates an example of a data frame issued by the encoder 26. The coefficients segment is contained in the field LSF ("Line Spectral Frequencies"), while the excitation segment is basically the rest of the data frame and includes a pitch lag field, an ACB ("Adaptive Codebook") gain field and an FCB ("Fixed Cookbook") field. Further details on the structure of the data frame are not deemed necessary here since this information is known or could be retrieved in the literature by those skilled in the art.

Referring back to FIG. 1, when the encoder 26 is in its default mode of operation which is the TTY/TDD inactive mode, it processes the PCM samples in the input signal into the same manner irrespective of whether the PCM samples contain speech sound information or Baudot tones. In both cases the audio information is encoded in the same way.

In practice, when Baudot tones are present in the PCM stream, the encoder 26 is caused to switch to the TTY/TDD active mode of operation that will be described below. Under this mode, the PCM signal and the TTY/TDD characters released from the TTY/TDD character classifier 24 are encoded somewhat differently. It should be emphasized however that the encoder 26 has the ability to encode Baudot tones as any other audio information applied at its input, in addition to its capability to encode Baudot characters under the TTY/TDD active mode.

The encoder 26 switches to the TTY/TDD active mode when it receives character information from the TTY/TDD classifier 24. The encoder 26 will insert a special code in the pitch lag field of the data frames representing the TTY/TDD character. In addition, the adaptive codebook gain field is set to a value that indicates a no gain condition. Finally, the Baudot tones audio information contained in the PCM stream is processed by the encoder as usual to generate the coefficients segment to be placed in the LSF field. Since the Baudot tones are generated at a very low bit rate (45.45 bits per second) the audio information for a single (TTY/TDD) character spans multiple data frames. In the data frames associated to a single TTY/TDD character, the bits in the pitch lag field convey the same TTY/TDD character information.

When the encoder 26 has finished assembling the data frame, the frame is released into the wireless communication channel that links the wireless communication device to a remote site. In a specific nonlimiting example of implementation, the wireless communication device is a base station of a cellular network that communicates with the wireless telephone at the remote site. Note that for a full duplex communication, the wireless telephone is provided with a transmitter that is identical to the transmitter of the base station, with the exception that the input signal containing the PCM samples originates from the microphone picking up the speech of the subscriber while in the case of a base station the input signal containing the PCM samples is issued by the network.

In a specific nonlimiting example of implementation, the wireless telephone communicates with the base station under the code division multiple access (CDMA) under the TIA-IS-95 protocol. It will be apparent to a person skilled in the art that other protocols can be used without departing from the spirit of the invention.

FIG. 2 illustrates functionally the receiver of the wireless communication device. The receiver identified by the reference numeral 30 receives the data frames from the communication channel and processes the data frames to generate the PCM stream that conveys either speech sound information or Baudot tones. The receiver 30 comprises a CELP decoder 32 that includes an input 34 to which are supplied the data frames and an output 36 that issues the stream of PCM samples.

The decoder 32 can acquire two possible operative modes namely the TTY/TDD active mode or the TTY/TDD inactive mode. In the TTY/TDD active mode, the decoder 32 extracts the TTY/TDD character based solely on the information contained in the pitch lag field and the adaptive codebook gain value field in the data frames. When the TTY/TDD inactive mode, the decoder 32 processes the data frames as an ordinary CELP decoder, reconstructing the PCM stream from the compressed audio information, either Baudot tones or speech sound information contained in the data frames. The decoder 32 can switch automatically from the TTY/TDD inactive mode which is its default mode of operation to the TTY/TDD active mode by observing the incoming data frames. When a data frame is seen that contains a value in the adaptive codebook gain field indicative of a no gain condition, the decoder 32 infers that the data frame has been sent by an encoder in its TTY/TDD active mode and the decoder 32 switches to the TTY/TDD active mode.

For reasons of simplicity, the TTY/TDD device that is connected to the output of the decoder 32 has not been shown since it does not form part of the present invention. Suffice it to say that the TTY/TDD device includes a display to visibly depict to the user the characters contained in the data frames. The TTY/TDD device has an input that receives the Baudot tones contained in the PCM stream output by the decoder 36 and an internal circuitry that decodes the tones in characters that are then displayed to the user.

As in the case of the encoder 26, the decoder 32 is implemented by a digital signal processor that is programmed to perform the desired functionality.

The decoder 32 includes an output 38 over which is issued a control signal that is directed to the encoder 26 of the wireless communication device. The output 38 is used to change the operative state of the transmitter 20 in order to enable a communication between the wireless communication device and the remote site at a variable data rate. FIG.

4 illustrates the functional relationship between the transmitter 20 and the receiver 30.

When the decoder 32 receives a data frame in which the adaptive codebook gain field is set to a value indicative of a no gain condition, and the bits in the pitch lag field of the data frame convey a TTY/TDD silence message which has the effect of blanking the output of the decoder 32 from any TTY/TDD character, the decoder 32 switches to a special operative state in which it expects to receive data frames at a lower data rate. At the same time the decoder 32 issues over the link 38 a control message to the transmitter 20 that causes the transmitter 20 also to acquire the operative state in which the data frames are sent at a lower data rate to the remote station.

FIG. 3a illustrates the structure of a data frame sent at the full rate, while FIG. 3b shows the structure of a data frame sent at a lower rate, that corresponds to ½ of the full rate. It will be noted that the sole difference between the frames resides in the size of the fixed codebook (FCB) field that has been significantly reduced in the half rate frame. This has no negative impact on the interpretation of the Baudot tones at the receiver section 30 since the receiver section 30 interprets the tones from the TTY/TDD codes in the pitch lag field. At the same time, the transmission between the two sites is made in a more efficient manner, in particular by providing a more efficient bandwidth use.

The TTY/TDD information entered in the pitch lag field contains header and character information. When the transmitter section 20 is transmitting a TTY/TDD character, the header contains a sequence number to distinguish that character from its preceding and following neighbors. The same header and character information shall be transmitted for each instance of a character for a minimum of 7 data frames and a maximum of 16 data frames. The header cycles through its range of valid values, one value for each instance of a character. The valid values for the TTY/TDD header and character fields according to the "Baseline text for the IS-127 EVRC TTY/TDD Extension, TR45.5.1.1/99.04.22.16" are specified in the table below:

| | Range | |
| --- | --- | --- |
| Description | Header (2 bits) | Character (5 bits) |
| Reserved | 0 | 0–31 |
| TTY/TDD character | 1–2 | 0–31 |
| TTY/TDD silence | 3 | 4 |
| Reserved | 3 | 0–3, 5–31 |

Figure 4:
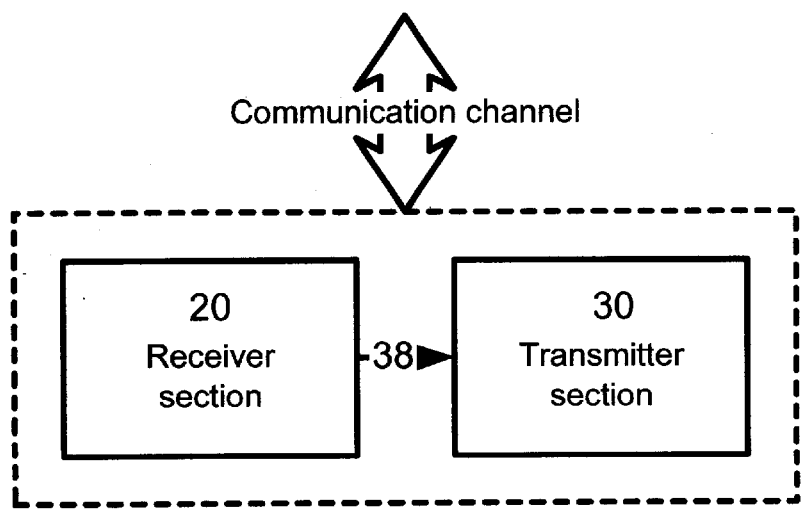
FIG. 4 is a block diagram of the wireless communication device in accordance with the invention depicting the transmitter and the receiver shown in FIGS. 1 and 2, respectively, in one common unit.

Continuing with the example illustrated at FIG. 4, when the receiver 30 switches to the lower data rate operative state, it issues over the link 38 a control signal that, as mentioned earlier, causes the transmitter 20 also to acquire the lower data rate operative state. In addition, the transmitter 20 issues over the communication channel to the remote site a data frame containing a TTY/TDD silence message that will cause the receiver 30 at the remote site switch to the lower data rate operative state. Accordingly, both wireless communication devices are now exchanging TTY/TDD information at a lower data rate.

If at any point the receiver 30 stops receiving data frames in which the adaptive codebook gain field contains a value indicative of a no gain condition, the receiver 30 switches to its default state at which the data rate is increased to a high rate, in other words the receiver section 30 new expects to receive data frames of the type depicted in FIG. 3a. In addition, the receive also switches to the TTY/TDD inactive mode. At the same time, a control signal is issued over the link 38 to cause the transmitter 20 to switch to the higher data rate operative state such that the transmitter section 20 issues the data frames shown in FIG. 3a. Also, the transmitter 20 is caused to switch to the TTY/TDD inactive mode.

Figure 5:
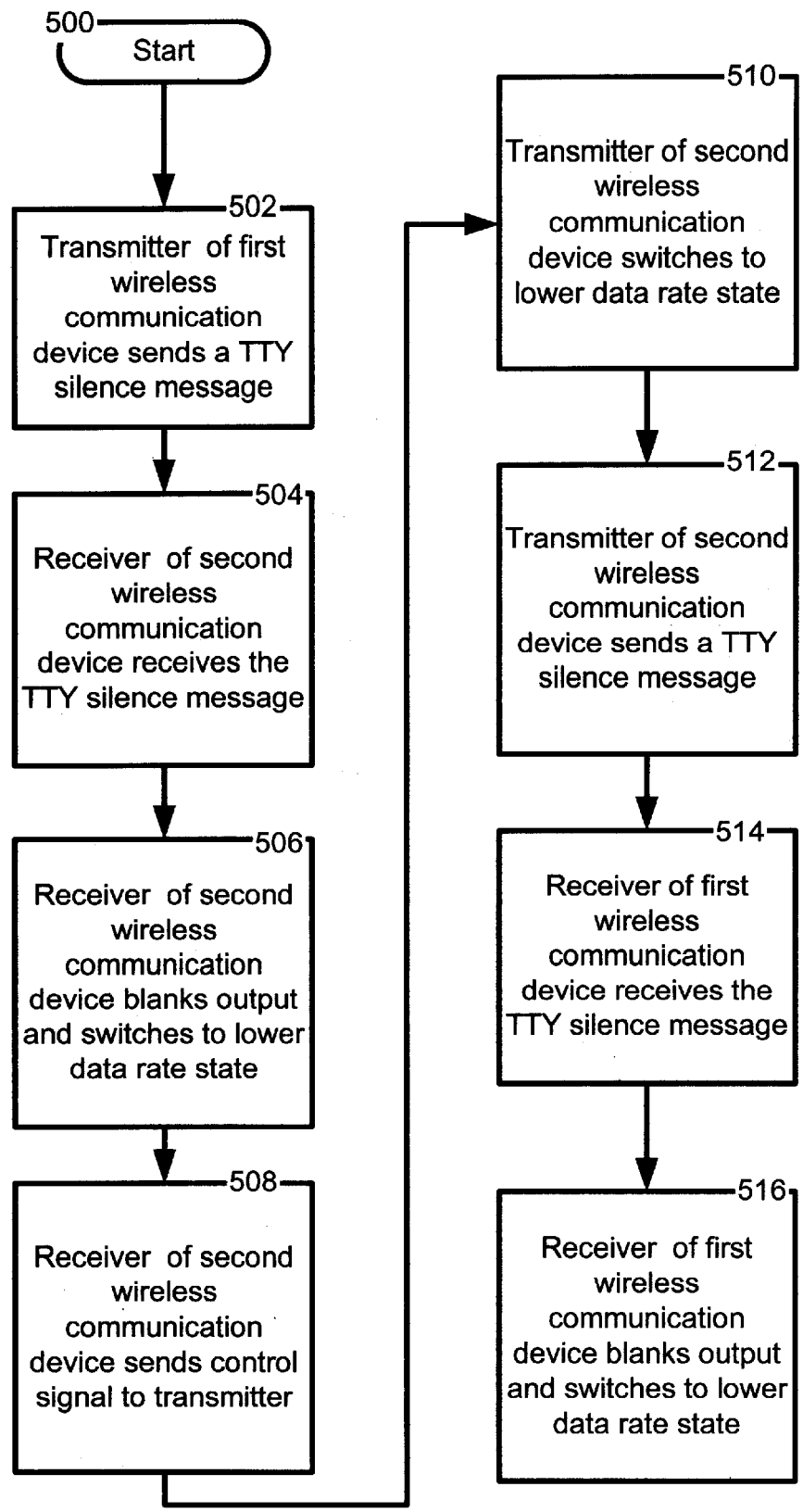
FIG. 5 is a flowchart illustrating the operation of the wireless communication device in accordance with the invention.

The flowchart at FIG. 5 illustrates the process in greater detail.

At step 500 the process starts. At step 502 one of the wireless communication devices (the first wireless communication device) sends to the other wireless communication device (the second wireless communication device) a data frame containing a TTY/TDD silence message. At step 504 the receiver of the second wireless communication device relates the TTY/TDD silence message and at step 506 it blanks its output of TTY/TDD characters and also switches to the lower data rate operative state. At step 508 the receiver of the second wireless communication device issues a control signal to the transmitter of the second wireless communication device. At step 510 the transmitter of the second wireless communication device switches to the lower data rate operative mode. At step 512 the transmitter of the second wireless communication device sends to the first wireless communication device a data frame containing a TTY/TDD silence message. At step 514 the receiver of the first wireless communication device receives the TTY/TDD silence message and at step 514 the receiver of the first wireless communication device blanks its output and switches to the lower data rate state. At this point both the first and the second wireless communication devices operate at the lower data rate operative state.

The above description of a preferred embodiment under the present invention should not be read in a limitative manner as refinements and variations are possible without departing from the spirit of the invention. The scope of the invention is defined in the appended claims and their equivalents.

I claim:

1. A wireless communication device capable to receive and transmit TTY/TDD messages, said wireless communication device having a receiver that includes:

an input for receiving an RF signal from a remote site containing a succession of data frames transporting speech sound information or a TTY/TDD message;

said receiver being operative for processing the data frames, said receiver capable to selectively acquire a TTY/TDD active mode when the data frames convey a TTY/TDD message and a TTY/TDD inactive mode when the data frames convey speech sound information, when in said TTY/TDD active mode said receiver capable to acquire either one of a first operative state in which said receiver is operative to process the data frames at a first data rate and a second operative state in which said receiver is operative to process data frames at a second data rate that is lower than the first data rate, when in said TTY/TDD active mode said receiver processing the data frames to generate an output signal conveying successive characters of the TTY/TDD message;

an output for releasing the output signal;

said receiver, when in said TTY/TDD active mode, being responsive to a TTY/TDD silence message contained in at least one data frame directing said receiver to blank the output signal from any TTY/TDD character, to acquire said second operative state.

2. A wireless communication device is defined in claim 1, wherein a data frame includes a pitch lag field, said receiver in said TTY/TDD active mode being operative to derive a TTY/TDD character from a bit sequence contained in the pitch lag field.

3. A wireless communication device as defined in claim 2, wherein the bit sequence includes a header portion and a character information portion.

4. A wireless communication device as defined in claim 2, wherein said wireless communication device has a transmitter for sending to the remote site data frames, said receiver when in said TTY/TDD active mode, being responsive to a TTY/TDD silence message contained in at least one data frame for causing said transmitter to send a TTY/TDD silence message to the remote site.

5. A wireless communication device as defined in claim 4, wherein said transmitter being capable to acquire either one of a first operative state in which said transmitter is operative to transmit the data frames at the first data rate and a second operative state in which said transmitter is operative to transmit data frames at a second data rate that is lower than the data rate during the first operative state of the transmitter.

6. A wireless communication device as defined in claim 5, wherein said receiver when in said TTY/TDD active mode, being responsive to a TTY/TDD silence message contained in at least one data frame for causing said transmitter to acquire the second operative state.

7. A wireless communication device as defined in claim 3, wherein the second data rate corresponds approximately to one half of the first data rate.

8. A wireless communication device as defined in claim 2, wherein a data frame includes an adaptive codebook gain field, a data frame containing a TTY/TDD silence control message contains a value in the adaptive codebook gain field that would signal a no gain condition to said receiver if said receiver is in said TTY/TDD inactive mode.

9. A wireless communication device as defined in claim 2, wherein said receiver includes a CELP decoder.

10. A wireless communication device as defined in claim 2, wherein said transmitter includes an CELP encoder.

11. A wireless communication device as defined in claim 2, wherein said transmitter includes an input for receiving a signal containing PCM samples.

12. A wireless communication device as defined in claim 11, wherein said transmitter includes a TTY/TDD detector coupled to said input for sensing a presence of Baudot tones in the signal of PCM sample.

13. A wireless communication device as defined in claim 12, wherein said TTY/TDD detector includes an output for releasing a signal indicative of logical values contained in the signal of PCM samples when the signal of PCM samples contains Baudot tones.

14. A wireless communication device as defined in claim 13, wherein said transmitter includes a TTY/TDD character classifier coupled to said TTY/TDD detector for receiving the signal indicative of logical values.

15. A wireless communication device as defined in claim 14, wherein said TTY/TDD character classifier is operative to process the signal indicative of logical values to extract TTY/TDD characters conveyed by the logical values in the signal of logical values.

16. A wireless communication device as defined in claim 2, wherein said wireless communication device is a base station of a cellular network.

17. A wireless communication device as defined in claim 2, wherein said wireless communication device is cellular telephone.

18. A wireless communication device as defined in claim 2, wherein the RF signal is sent according to a CDMA technique.

19. A wireless communication device as defined in claim 2, wherein the output signal converting successive characters of the TTY/TDD message contains tones.

20. A method for processing an RF signal, comprising:
receiving the RF signal from a remote site, the RF signal containing a succession of data frames transporting speech sound information or a TTY/TDD message;
supplying the data frames to a receiver, said receive capable to selectively acquire a TTY/TDD active mode when the data frames convey a TTY/TDD message and a TTY/TDD inactive mode when the data frames convey speech sound information, when in said TTY/TDD active mode said receiver being capable to acquire either one of a first operative state in which said receiver is operative to process the data frames at a first data rate and a second operative state in which said receiver is operative to process data frames at a second data rate that is lower than the first data rate, when in said TTY/TDD active mode said receiver processing the data frames to generate an output signal conveying successive characters of the TTY/TDD message;
when said receiver is in said TTY/TDD active mode, and when at least one data frame is received that conveys a TTY/TDD silence message causing said receiver to blank of output signal from any character of a TTY/TDD message, switching said receiver to said second operative state.

21. A wireless communication device capable to receive and transmit TTY/TDD messages, said wireless communication device having a receiver that includes:
input means for receiving an RF signal from a remote site containing a succession of data frames transporting speech sound information or a TTY/TDD message;
said receiver capable to selectively acquire a TTY/TDD active mode when the data frames convey a TTY/TDD message and a TTY/TDD inactive mode when the data frames convey speech around information, when in said TTY/TDD active mode said receiver being capable to acquire either one of a first operative state in which said receiver is operative to process the data frames at a first data rate and a second operative state in which said receiver is operative to process data frames at a second data rate that is lower than first data rate, when in said TTY/TDD active mode said receiver processing the data frames to generate an output signal conveying successive characters of the TTY/TDD message;
output means coupled to said receiver for releasing the output signal;
said receiver, when in said TTY/TDD active mode, being responsive to a silence control message contained in at least one data frame directing said receiver a blank the output signal from any character of a TTY/TDD message, to acquire said second operative state.

22. A wireless communication device capable to receive and transmit TTY/TDD messages, said wireless communication device comprising:
a transmitter for transmitting an RF signal to a remote site containing a succession of data frames transporting speech sound information or a TTY/TDD message;

a receiver that includes:
  a) an input for receiving an RF signal from the remote site containing a succession of data frames transporting speech sound information or a TTY/TDD message;
  b) said receiver being capable to acquire either one of a first operative state in which said receiver is operative to process the data frames at a first data rate and a second operative state in which said receiver is operative to process data frames at a second data rate that is lower than the first data rate;
  c) an output for releasing an output signal from said receiver;
  d) said receiver being respective to a TTY/TDD silence message contained in at least one data frame directing said receiver to blank the output signal from an TTY/TDD character to:
     i) acquire and second operative state;
     ii) cause said transmitter to issue toward the remote site a TTY/TDD silence message.

* * * * *